US009342854B2

(12) United States Patent
Barbieri et al.

(10) Patent No.: US 9,342,854 B2
(45) Date of Patent: May 17, 2016

(54) IDENTIFYING COMMUNITIES WITHIN A SOCIAL NETWORK BASED ON INFORMATION PROPAGATION DATA

(71) Applicant: Yahoo! Inc., Sunnyvale, CA (US)

(72) Inventors: Nicola Barbieri, Barcelona (ES); Francesco Bonchi, Barcelona (ES); Giuseppe Manco, Settino de Montalto Uffugo (IT)

(73) Assignee: Yahoo! Inc., Sunnyvale, CA (US)

( * ) Notice: Subject to any disclaimer, the term of this patent is extended or adjusted under 35 U.S.C. 154(b) by 274 days.

(21) Appl. No.: 13/889,866

(22) Filed: May 8, 2013

(65) Prior Publication Data

US 2014/0337356 A1 Nov. 13, 2014

(51) Int. Cl.
*G06F 17/30* (2006.01)
*G06Q 50/00* (2012.01)

(52) U.S. Cl.
CPC ...................................... *G06Q 50/01* (2013.01)

(58) Field of Classification Search
CPC .............. G06F 17/30958; G06F 17/30; G06F 17/30268; G06F 17/3064; G06F 17/30702; G06F 17/3097; G06F 3/0237; G06F 17/30595
USPC .......................................... 707/748, 734, 798
See application file for complete search history.

(56) References Cited

U.S. PATENT DOCUMENTS 7,472,118 B2 * 12/2008 Hirst ......................... G06F 8/35
8,108,389 B2 * 1/2012 Bobick ............... G06F 17/2795 704/9
8,306,922 B1 * 11/2012 Kunal .................... G06Q 30/02 705/319
8,396,855 B2 * 3/2013 Aggarwal et al. ............. 707/709
8,684,740 B2 * 4/2014 Jenkins .................. G09B 19/00 434/156
8,700,705 B2 * 4/2014 Danezis ............ G06F 17/30522 709/204
2006/0271564 A1 * 11/2006 Meng Muntz et al. ........ 707/100
2009/0089271 A1 * 4/2009 Hirst ...................... G06F 9/4446
2011/0145160 A1 * 6/2011 Hajiaghayi ...... G06Q 10/06395 705/319
2011/0295626 A1 * 12/2011 Chen et al. ................... 705/7.11
2012/0001919 A1 * 1/2012 Lumer .......................... 345/440
2012/0182882 A1 * 7/2012 Chrapko et al. .............. 370/248
2013/0138662 A1 * 5/2013 He et al. ......................... 707/748
2014/0115014 A1 * 4/2014 Mori ..................... G06F 3/1204 707/821
2014/0188862 A1 * 7/2014 Campbell et al. ............. 707/728

* cited by examiner

*Primary Examiner* — Debbie Le
(74) *Attorney, Agent, or Firm* — Martine Penilla Group, LLP

(57) ABSTRACT

Methods and systems for identifying communities based on information propagation data are described. One of the methods includes receiving a social graph, which includes nodes and relationships between the nodes. The method further includes receiving a number of the communities to find within the social graph, receiving data regarding propagation of information between the nodes, and calculating a probability of formation of a link between a first one of the nodes and a second one of the nodes based on the data. The link provides a direction of flow of media between the first and second nodes. The method includes calculating a probability that media will be accessed by the second node based on the data. One of the communities includes the first node, the second node, and the link.

20 Claims, 6 Drawing Sheets

IDENTIFYING COMMUNITIES WITHIN A SOCIAL NETWORK BASED ON INFORMATION PROPAGATION DATA

TECHNICAL FIELD

The present disclosure relates generally to methods and systems for identifying communities within a social network based on information propagation data.

BACKGROUND

The Internet has allowed a rapid growth of social networks. In a social network, a user shares his/her/its images, videos, posts, comments, etc., with other users. For example, a user posts a picture to his account to allow a friend to view the picture. As another example, a user may share a video with another user via a social network account. A lot of advertisers also advertise on social networks to entice the users to purchase products or services.

However, the information that is available from a social network is limited. For example, in a social network, the information is limited to identification of friendships between users, identification of followers of a user, identification of videos downloaded, identification of posts made by users, identification of images posted by users, etc.

It is in this content that various embodiments described in the present disclosure arise.

SUMMARY

The following detailed description together with the accompanying drawings will provide a better understanding of the nature and advantages of various embodiments described in the present disclosure.

In various embodiments, a probability server system is provided. The probability server system determines a likelihood of a link being established between nodes u and v of a social graph based on levels of involvement of the nodes within a community. The probability server system further determines a probability that information will flow from one node to another based on the levels of involvement. For example, when a first node downloads media about a topic that is suggested by a second node, there is a higher probability that a link between the first and second nodes associated with the media will be established and that the second node will transfer additional media regarding the topic to the first node compared to a probability when the first node does not download the media.

In various embodiments, the node u belongs to more than one community, e.g., topic, title, interest, etc., and a link between two nodes is associated with a topic.

In some embodiments, both information propagation and social ties formation in a social network are explained according to a latent factor, e.g., active level of involvement of a user within the social network, passive level of involvement of a user within the social network, etc., which ultimately guide a user behavior within the social network. A user is identified as a node within the social network.

In various embodiments, a probability server system includes a stochastic mixture membership generative model that fits, at the same time, social ties and a set of cascades of the propagation of information to the social graph. In several embodiments, the model produces overlapping communities and for each node, a level of authority of each node and passive interest of each node in each community to which the node belongs.

In a number of embodiments, users, e.g., individuals, entities, etc., tend to adopt the behavior of their social peers, so that the cascades happen first locally, within close-knit communities, and become global/viral phenomena when the cascades are able to cross boundaries of densely connected clusters of users. Therefore, an operation of social contagion is intrinsically connected to understanding a modular structure of social networks, e.g., community detection, etc., and a combination of the social contagion and the modular structure form a core of network science.

In various embodiments, a modular structure of social networks and the operation of social contagion are applied jointly and are intrinsically connected.

In some embodiments, a probability server system is provided. The probability server system determines that each observation is a result of a stochastic process where the node u acts in a social network according to a set of topics, which also represent his/her/its interests. Given a community k, the probability server system determines that a degree of involvement of the node u in the community k is governed by two parameters, namely $\pi_u^{k,s}$ and $\pi_u^{k,d}$, where s is a source node, e.g., the node u, and d is a destination node, e.g., the node u. The parameter $\pi_u^{k,s}$ measures a degree of active involvement of the user u in the community k and the parameter $\pi_u^{k,d}$ measures a degree of passive involvement of the node v the community k.

In several embodiments, the node u uses a social network for three communities, e.g., topics, etc. As an example, the three communities include network science and data mining, the city of Barcelona, and a rock legend. The node u is actively posting on the social network regarding the first community of network science and data mining for communicating with other nodes. The node u is passively listening regarding the other two communities. For example, for sake of obtaining information, the node u follows users who are information sources for events happening in Barcelona and users which are authorities in the topic of rock legend. In various embodiments, nodes that are sources of information usually have a large number of followers and are, in some sense, influential. In the second and third communities, the node u might re-post some pieces of information, but it is quite unlikely that the node u would produce some original information. The probability server system determines that the node u engages in a high amount of active involvement $\pi_u^{k,s}$ in the first community by using the social network and a high amount of passive involvement $\pi_u^{k,d}$ in the first community, and determines that the user u has a high amount of passive involvement $\pi_u^{k,d}$ in the second and third communities. In various embodiments, the node u has many followers in the first community and almost no followers in the other two communities.

In some embodiments, the probability server system determines a likelihood of the node u posting information on a topic, a likelihood the information being further propagated, and/or a likelihood of the node u having followers interested in the topic, and the likelihoods are correlated. In various embodiments, the three likelihoods are derived by the probability server system based on the parameter $\pi_u^{k,s}$. Similarly, the probability server system determines a likelihood of being influenced by other users in a community based on the parameter $\pi_s^{k,d}$ to jointly model the clusters and cascades.

In various embodiments, a method for identifying communities within a social network based on information propagation data is described. The method includes receiving a social graph, which includes nodes and relationships between the nodes. The method further includes receiving a number of the communities to find within the social graph, receiving data regarding propagation of information between the nodes, and calculating a probability of formation of a link between a first one of the nodes and a second one of the nodes based on the data. The link provides a direction of flow of media between the first and second nodes. The method includes calculating a probability that media will be accessed by the second node based on the data. One of the communities includes the first node, the second node, and the link. The method is executed by a processor.

In several embodiments, a method for identifying communities within a social network based on information propagation data is described. The method includes receiving a social graph, which includes nodes and relationships between the nodes. The method further includes receiving a number of the communities to find within the social graph, receiving data regarding propagation of information between the nodes of the social graph, and for each community, determining a probability of existence of a link between the nodes. The link provides a direction of propagation of information between the nodes. The method includes determining a probability of occurrence of an activation in the community of one or more of the nodes. The activation includes a passive involvement of accessing information. The method is executed by a processor.

In a number of embodiments, a server system for identifying communities within a social network based on information propagation data is described. The server system includes one or more processors for receiving a social graph. The social graph includes nodes and relationships between the nodes. The one or more processors receive a number of the communities to find within the social graph, receive data regarding propagation of media between the nodes, and calculate a probability of formation of a link between a first one of the nodes and a second one of the nodes based on the data. The link provides a direction of flow of media between the first and second nodes. The one or more processors calculate a probability that the media will be accessed by the second node based on the data. One of the communities includes the first node, the second node, and the link. The server system includes a memory device for storing the community.

DETAILED DESCRIPTION

The following example embodiments and their aspects are described and illustrated in conjunction with apparatuses, methods, and systems which are meant to be illustrative examples, not limiting in scope.

Figure 1:
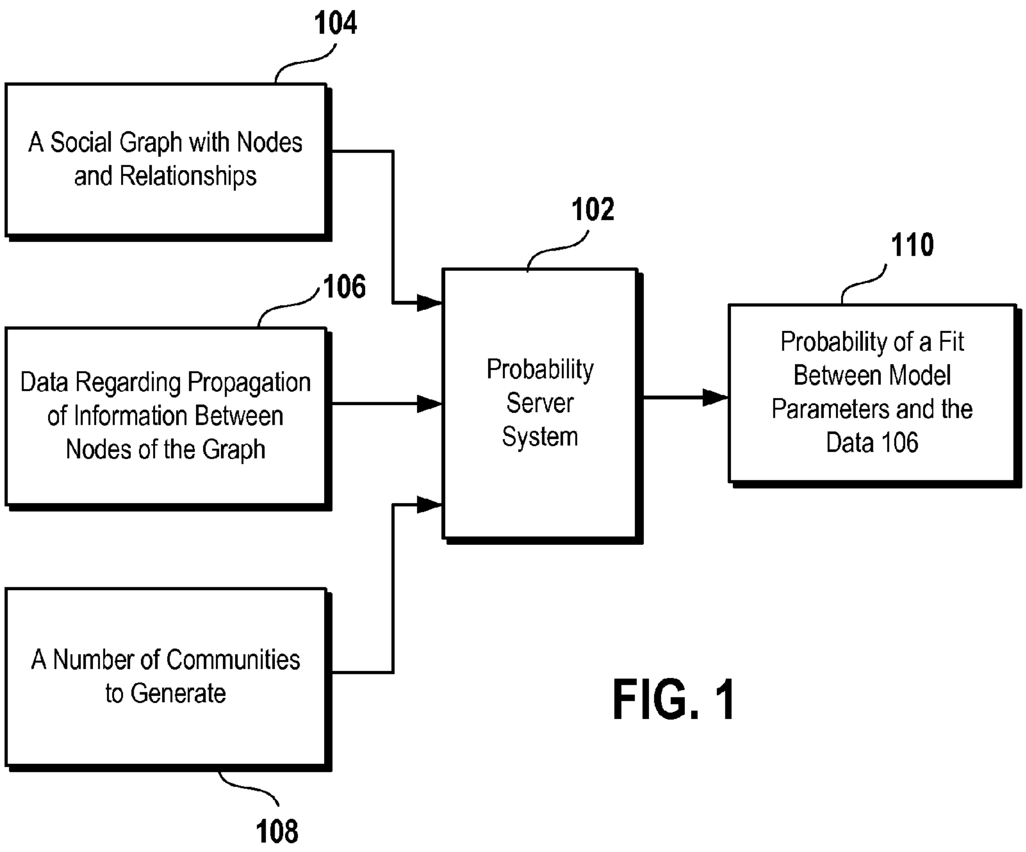
FIG. 1 is a block diagram of an embodiment of a probability server system used to determine a probability of a fit between model parameters and data regarding propagation of information and a social network, in accordance with some embodiments described in the present disclosure.

FIG. 1 is a block diagram of an embodiment of a probability server system 102 used to determine a probability of a fit between model parameters and data regarding propagation of information and a social network. In some embodiments, a server system includes one or more servers. Each server includes one or more processors and one or more memory devices. It should be noted that in some embodiments, a processor, as used herein, includes a microprocessor, a central processing unit (CPU), a microcontroller, an application specific integrated circuit (ASIC), or a programmable logic device (PLD), etc., that performs operations described below. As used herein, a memory device includes a read-only memory (ROM), a random access memory (RAM), or a combination of the ROM and RAM. Examples of a memory device include a hard disk, a flash memory, a redundant array of independent disks (RAID), a computer disc ROM (CD-ROM), etc.

In some embodiments, a social graph is a sociogram, which is a graph that depicts relations between Internet users, e.g., entities, people, a combination thereof, etc., in the social network. In various embodiments, a social graph is a mapping of relationships between people, between entities, or between people and entities in a social network. Examples of relationships between people include a family relationship, a colleague relationship, a friend relationship, an acquaintance relationship, a dating relationship, a follower-followed relationship, etc. In various embodiments, a follower is notified, by one or more processors that provide a social network service, of posts within a social network made by a node that is followed by the follower. For example, when the followed node uploads a post to his/her/its social network account, the post is also posted within a social network account of the follower. In some embodiments, relationships between two users in a social graph are represented by an edge in the social graph and each user is referred to as a node of the social graph. For example, the social graph includes nodes N1, N2, and N3. In this example, there is a relationship between the nodes N1 and N2 but not relationship between the nodes N1 and N3 and no relationship between the nodes N2 and N3.

In some embodiments, a node is a social network account that is associated with a user. For example, a first node is a social network account that is associated with a user and a second node is another social network account that is associated with the same or a different user. The social network account is maintained by a social network server that provides a social network service. As another example, a first node is a social network account that is accessed with a first user name and/or a first user password and a second node is a social network account that is accessed with a second user name and/or a second user password.

In various embodiments, when a first user follows a second user, any information posted by the second user in his/her/its social network account is posted within a social network account of the first user.

In several embodiments, a user creates a social network account to access a social network service via the Internet. For example, a user provides his/her/its name to one or more processors of a social network and the name is stored to identify the user. As another example, a user provides other user facts, e.g., education, a product offered by the user, demographics of the user, a service offered by the user, relationship with other users, geographic location of the user, photographs of the user, history of the user, etc., to one or more processors of a social network.

A user accesses a social network account on the Internet when a username and/or a password assigned to the user are authenticated. For example, one or more servers of an authentication server authenticate the username and password of the user to allow the user access to a social network account of the user on the World Wide Web.

In some embodiments, a user uses a social network service to perform one or more tasks, e.g., post media, download media, review media, comment on the posted media, etc. Examples of media include audio, video, image, text, or a combination thereof. The text may include a suggestion made by a node of the social graph 104, an opinion of the node, a rule posted by the node, a guideline posted by the node, an article posted by the node, etc.

The probability server system 102 receives a social graph 104 having nodes and relationships between the nodes. In some embodiments, the social graph 104 is a directed social graph in which a node v is a follower of u, e.g., v is notified of u's activity within the social network 104. For example, the node v can see information posted by u and propagate the information, so that the information is available to followers of v.

The probability server system 102 further determines data 106 regarding propagation of information between nodes of the social graph 104. For example, the probability server system 102 determines data regarding reception of media by a node of the social graph 104 from another node of the social graph 104. Examples of data regarding reception of media by a node of the social graph 104 from another node of the social graph 104 include an identifier of the media, an identifier of a node that posted the media, an identifier of a node that generated and posted the media, an identifier of a node that receives the media, and time-related information associated with the propagation of the media. In some embodiments, a node that receives media is a follower of a node that sends the media. In various embodiments, a node that receives media is a social network friend of a node that sends the media. In several embodiments, a node that generates media or a node that generates and posts the media is being followed by a node that receives the media that is posted. Examples of an identifier of a media include a title of the media, a uniform resource locator (URL) of a web page in which the media is embedded, a hyperlink to the media, a name of the media, a topic of the media, a subject matter of the media, content of the media, a keyword extracted from the media, metadata about the media, or a combination thereof.

In some embodiments, an identifier of a media is used by the probability server system 102 to determine the media that propagates within a social network.

In various embodiments, instead of determining the data 106, the probability server system 102 receives the data 106 regarding propagation of information from one or more other servers (not shown) located outside the probability server system 102. The other or more other servers determine the data 106 is a similar manner as that described above in which the probability server system 102 determines the data 106.

In some embodiments, the one or more processors of the probability server system 102 determine an identifier of the media from content of the media. For example, the one or more processors of the probability server system 102 determine a title, a topic, a subject matter, or a name of media as a word that occurs most frequently of all words in content of the media compared to other words within the content. As another example, the one or more processors of the probability server system 102 determine a title, a topic, a subject matter, or a name of media as one or more characters that are highlighted in bold and have a largest font among other fonts within content of the media.

Examples of identifier of a node include a username used to access a social network account, a password used to access the social network account, a demographic of a user having the username and/or password, or a combination thereof. Examples of time-related information associated with the propagation of media include a time at which the media was sent, e.g., posted by, etc., from a source node, a time at which the media was generated by the source node, and/or a time at which the media was received by, e.g., posted within a social network account of, etc., a destination node. In some embodiments, a time at which media is sent from a source node to a destination node is the same as a time at which the media is posted to a social network service account of the source node and/or a time at which the media is received by a social network service account of the destination node.

The probability server system 102 receives a number 108 of communities to identify within the social graph 104. The number 108 is provided by a user via an input device of a client device. For example, the user selects that two communities be identified within the social graph 104. As another example, the user selects that three communities be identified within the social graph 104. Examples of the client device include a smart phone, a tablet, a laptop, a desktop computer, or a smart television, etc. Examples of the input device include a mouse, a keypad, a keyboard, a stylus, a touchscreen, a microphone, etc. An example of a community includes a topic of media, a title of the media, a name of the media, a subject matter of the media, a keyword extracted from the media, content of the media, metadata about the media, user interest, or a combination thereof, etc. Examples of user interest include city of Barcelona, a rock legend, network science, data mining, etc.

The probability server system 102 receives the social graph 104, the data 106 regarding propagation of media between nodes of the social graph 104 and the number 108 of communities, e.g., communities C1, C2, and C3 within the social graph 104, to identify the communities within the social graph 104 and to determine a probability 110. The probability 110 represents a quality of the probability server system 102. For example, the higher the probability 110, the better the quality of the probability server system 102. As another example, the probability 110 represents a quality of a fit between model parameters Θ and the data 106 regarding propagation of information and the social graph 104. The model parameters Θ are further described below. Each community C1, C2, and C3 includes two or more nodes and one or more links between the nodes.

Figure 2:
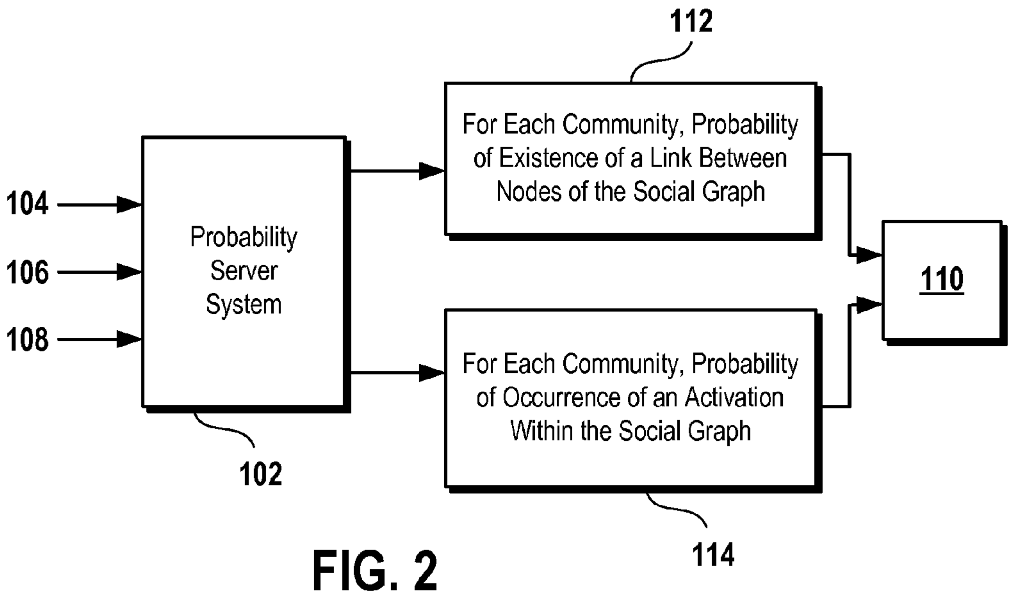
FIG. 2 is a diagram of an embodiment of the probability server system to determine a probability of existence of a link between nodes of the social graph and a probability of occurrence of an activation within the social graph to determine the probability of a fit between model parameters and data regarding propagation of information and the social network, in accordance with various embodiments described in the present disclosure.

FIG. 2 is a diagram of an embodiment of the server system 102 to determine a probability 112 of existence, e.g., formation, etc., of a link between nodes of the social graph 104 and a probability 114 of occurrence of an activation within the social graph 104, and the probabilities 112 and 114 are used to determine the probability 110. In some embodiments, activation and action are used interchangeably herein. In various embodiments, an activation of a node occurs when the node is influenced by another node. For example, when the node v accesses, e.g., downloads, views, accesses, interacts with, a combination thereof, etc., media upon receiving a suggestion, e.g., recommendation, etc., of the media from the node u, the node v is influenced by the node u. As another example, when the node v posts media to his/her/its social network account upon receiving a suggestion, e.g., recommendation, etc., of the media from the node u, the node v is influenced by the node u. As yet another example, when the node v accesses and/or posts media to his/her/its social network account upon receiving a suggestion, e.g., recommendation, etc., of the media from the node u, the node v is influenced by the node u.

A link between two nodes of the social graph 104 provides a direction of propagation of information between the two nodes. For example, when a link between first and second nodes is an arrow pointing from the first node to the second node, a probable direction of propagation of information is from the first node to the second node. As another example, when a link is formed between the first and second nodes and is directed from the first node towards the second node, information can flow from the first node to the second node. The one or more processors of the probability server system 104 determine the probability 112. To illustrate, the probability 112 includes a probability that a connection, e.g., a link, etc., will be established between nodes of the community C1, a probability that a connection will be established between nodes of the community C2, and a probability that a connection will be established between nodes of the community C3. Examples of a connection that will be established between nodes of a community include an influencer-influencee relationship. An influencer activates an influencee by posting information to his/her/its social network account and/or by generating and posting the information to his/her/its social network account. An influencee is influenced by or is involved in an activation, e.g., is activated. For example, an influencee receives information within his/her/its social network account that is posted by another node, e.g., an influencer, etc., and the influencee accesses media based on the information. As another example, an influencee receives a suggestion within his/her/its social network account from another node of the social graph 104 and follows the suggestion. To further illustrate, the suggestion may be that the influencee download media, e.g., music, video, article, text, movie, etc., from a website. As another illustration, the suggestion is that the influencee review an article. As yet another illustration, the suggestion is that the influencee select a hyperlink to download media from a website.

In some embodiments, when a first node downloads media that is suggested by a second node, the downloading is part of an activation of the first node.

In various embodiments, a node is activated with respect to information when the node receives the information from another node for a first time. For example, a node is activated regarding a topic when the node receives media regarding the topic for a first time. As another example, a node is activated regarding media when the node receives the media for a first time. In this example, the node is not activated again when the node receives media for a second time.

The one or more processors of the probability server system 104 determine the probability 114. To further illustrate, for each community, the probability 114 includes a probability that a node within the community will be influenced by another node within the community. As another illustration, for each community, the probability 114 includes a probability that information will be posted by a node of the community to be received by another node of the community. As yet another illustration, for each community, the probability 114 includes a probability that information will be received by a node within the community from another node of the community. As yet another illustration, for each community, the probability 114 includes a probability that information will be generated and posted, e.g., sent, etc., by a node of the community to another node within the community.

Figure 3A:
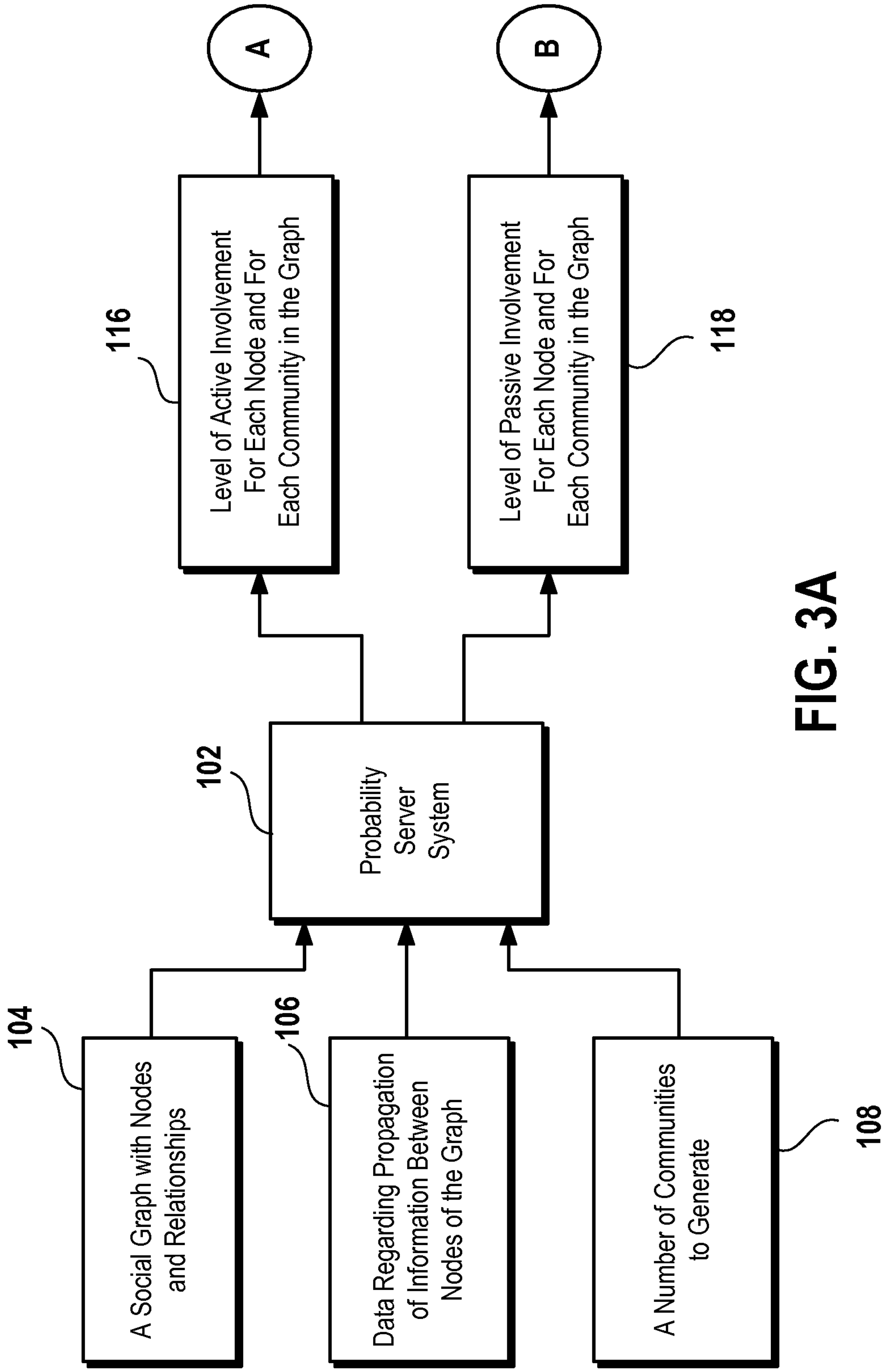
FIG. 3A is a diagram of an embodiment of the probability server system to illustrate generation of active and passive levels of involvement for each community and for each node of the social graph to determine the probability of a fit between model parameters and data regarding propagation of information and the social network, in accordance with several embodiments described in the present disclosure.

FIG. 3A is a diagram of an embodiment of the probability server system 102 to illustrate generation of levels 116 and 118 of involvement for each community and for each node of the social graph 104 to determine the probability 110 (FIG. 1). The probability server system 102 generates the level 116 of active involvement for each node and for each community of the social graph 104 from the data 106. For example, the probability server system 102 generates the level 116 of active involvement $\pi_u^{k,s}$, where k is a community, u is an influencer node, and s indicates that the influencer u is a source of information. For example, as a number of articles posted or both generated and posted by a node within the social graph 104 regarding a topic increases, the level of active involvement of the node regarding the topic increases. To further illustrate, when a first node within the social graph 104 posts information regarding “shoes” for a greater number of times than that posted by a second node within the social graph 104, a level of active involvement of the first node within the community “shoes” is greater than a level of active involvement of the second node within the community.

Other factors that are used to measure the level 116 of active involvement of a node within a community include a length of a post posted to a social network server or generated and posted to the social network server by the node within the community, a number of media posted to a social network server or generated and posted to the social network server by the node within the community, a number of bytes of media embedded in a post posted to a social network server or generated and posted to the social network server by the node within the community, a combination thereof, etc. For example, the greater the length of a post generated and/or posted by a node within a community, the higher the level of active involvement of the node within the community. As another example, the greater the number of bytes of a post generated and/or posted by a node within a community, the higher the level of active involvement of the node within the community. As another example, the higher the number of media posted by a node within a community, the higher the level of active involvement of the node within the community. Moreover, in some embodiments, a number of posts generated and/or posted by a node within a community, a length of a post generated and/or posted by the node within the community, a number of media generated and/or posted by the node within the community, a number of bytes of media generated and/or embedded in a post by the node within the community, or a combination thereof, are used to determine a level of active involvement of the node within the community.

In various embodiment, a node generates a post when the post is the node's original work, e.g., is not copied.

The probability server system 102 generates the level 118 of passive involvement for each node and for each community of the social graph 104 from the data 106. For example, the probability server system 102 generates a level of passive involvement $\pi_v^{k,d}$, where v is an influencee node and d indicates that the influencee v is a destination or receiver of information posted by an influencer within the community. For example, as a number of articles received and/or accessed by a node within the social graph 104 regarding a topic increases, the level of passive involvement of the node regarding the topic increases. To further illustrate, when a first node within the social graph 104 receives and/or accesses information regarding "cameras" for a greater number of times than that received and/or accessed by a second node within the social graph 104, a level of passive involvement of the first node within the community "cameras" is greater than a level of passive involvement of the second node within the community.

In some embodiments, a passive involvement excludes generating information for posting to a social network server. For example, any information generated and posted by a node to a social network server is excluded from a passive involvement of the node.

Other factors that are used to measure a level of passive involvement of a node within a community include a length of a post received and/or accessed by the node within the community, a number of media received and/or accessed by the node within the community, a number of bytes of media embedded in a post received and/or accessed by the node and/or downloaded by the node within the community, a combination thereof, etc. For example, the greater the length of a post received and/or accessed by a node within a community, the higher the level of passive involvement of the node within the community. As another example, the greater the number of bytes of a post received and/or accessed by a node within a community, the higher the level of passive involvement of the node within the community. As another example, the higher the number of media received and/or accessed by a node within a community, the higher the level of passive involvement of the node within the community. Moreover, in some embodiments, a number of posts received and/or accessed by a node within a community, a length of a post received and/or accessed by the node within the community, a number of media received and/or accessed by the node within the community, a number of bytes of media embedded in a post received by and/or accessed by the node within the community, or a combination thereof, are used to determine a level of passive involvement of the node within the community.

In some embodiments, reception and/or access of information is consumption of the information.

In various embodiments, a node hat has a high level of active involvement, e.g., greater than 50%, etc., in a community is likely to have a high number of outgoing links and produce content that will be consumed by other nodes in the community. In some embodiments, a node that has a high level of passive involvement, e.g., greater than 50%, etc., in a community is likely to have a high number of incoming links and consume content produced by its peers, e.g., other nodes, etc., in the community.

Figure 3B:
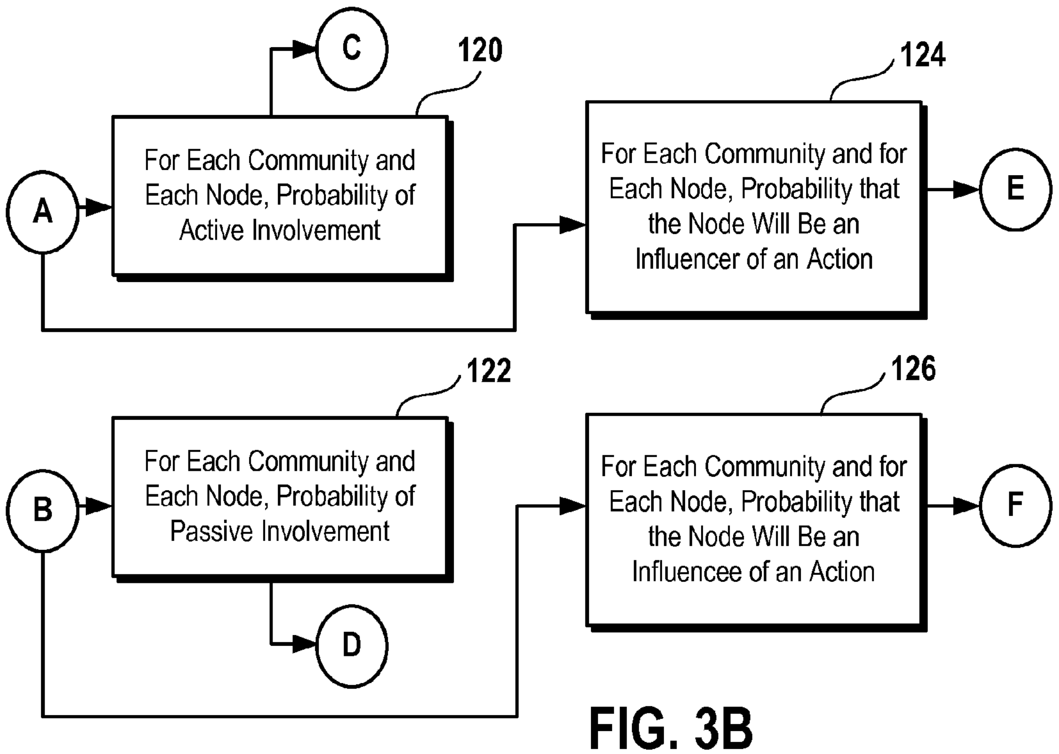
FIG. 3B is a diagram of an embodiment of a flow diagram illustrating a determination by the probability server system of probabilities of involvement of a node within a community and probabilities of transfer of information between nodes for each community and for each node of the social graph, in accordance with some embodiments described in the present disclosure.

FIG. 3B is a diagram of an embodiment of a flow diagram illustrating a determination by the one or more processors of the probability server system 102 (FIG. 3A) of probabilities 120 and 122 of involvement of a node within a community and probabilities 124 and 126 of transfer of information between nodes for each community and for each node of the social graph 104. The one or more processors of the probability server system 102 determine the probability 120 of active involvement of the node u within the community k as:

$$\vartheta_u^k = \frac{\exp\{\pi_u^{k,s}\}}{\sum_{u' \in N} \exp\{\pi_{u'}^{k,s}\}} \tag{1}$$

where "exp" is the exponential function, u' is an index that spans over all nodes of the social graph 104, N is a number of nodes within the social graph 104. For example, the probability 120 of active involvement of a node within a community is a ratio of an exponent of the level 116 of active involvement of the node within the community to a sum of exponents of active involvements of all nodes, of the social graph 104, within the community. In some embodiments, the numerator $\exp\{\pi_u^{k,s}\}$ of equation (1) is proportional to an outdegree of the node u.

Moreover, the one or more processors of the probability server system 102 determine the probability 122 of passive involvement of the node v within the community k as:

$$\varphi_v^k = \frac{\exp\{\pi_v^{k,d}\}}{\sum_{v' \in N} \exp\{\pi_{v'}^{k,d}\}} \tag{2}$$

where v' is an index that spans over all nodes, e.g., u, v, etc., of the social graph 104. For example, the probability 122 of passive involvement of a node within a community is a ratio of an exponent of the level 118 of passive involvement of the node within the community to a sum of exponents of passive involvements of all nodes, of the social graph 104, within the community. In some embodiments, the numerator $\exp\{\pi_v^{k,d}\}$ of equation (2) is proportional to an indegree of the node v.

In some embodiments, the one or more processors of the probability server system 102 determine a probability of existence of a link between the nodes u and v within the community k as high, e.g., more likely than not, greater than 50%, etc., when the probability 120 of active involvement of the node u within the community k is high, e.g., greater than 50%, and when the probability 122 of passive involvement of the node v within the community k is high, e.g., greater than 50%.

Also, the one or more processors of the probability server system 102 determine the probability 124 that the node u of the social graph 104 will be an influencer of the activation a within the community k as:

$$\theta_u^{k,a} = \frac{\exp\{\pi_u^{k,s}\}}{\sum_{u' \in F_{i_a}(t_a)} \exp\{\pi_{u'}^{k,s}\}} \tag{3}$$

where $F_{i_a}(t_a)$ is a set of activations a of posting or generating and posting information i, performed by the node u of the social graph 104 at a time $t_a$. For example, the probability 124 that a node u of the social graph 104 will be an influencer is a ratio of an exponent of the level 116 of active involvement, e.g., performing an activation a, etc., within the community k by the node u to a sum of exponents of active involvements by the node u within the community k until the time t.

Moreover, the one or more processors of the probability server system 102 determine the probability 126 that the node v of the social graph 104 will be an influencee of the activation a performed by the node u within the community k as:

$$\phi_{u,v}^{k,a} = \frac{\exp\{\pi_v^{k,d}\}}{\sum_{v':(u,v') \in A, v' \notin C_{i_a}(t_a-1)} \exp\{\pi_{v'}^{k,d}\}} \tag{4}$$

where A is a set of nodes that are followers and nodes that are being followed within the social graph 104 and $C_{i_a}(t_a-1)$ is a set of nodes that are actively involved in posting or generating and posting the information i by the time $(t_a-1)$. For example, the probability 126 that a node of the social graph 104 will be an influencee is a ratio of an exponent of the level 118 of passive involvement of the node within the community to a sum of exponents of passive involvements of nodes of the social graph 104 within the community k. As indicated by equation (4), the node v is not actively involved within the set $C_{i_a}(t_a-1)$ of nodes that are actively involved in posting or generating and posting information i by the time $t_a-1$.

In several embodiments, the node u propagates the information i and the node v is influenced to adopt, e.g., be activated by, etc., the information i when the node v is connected to the influencer u and the node v is inactive, e.g., is not previously influenced by the same information i, e.g., same topic of media, same article about the media, same title of the media, same name of the media, same metadata about the media, same content of the media, same subject matter of the media, etc.

In various embodiments, the set of nodes A is represented as (u, v), where the node v is a follower of u and is notified of u's activities, e.g., posting activity, etc., in the social network.

In various embodiments, the influencer node u is chosen among those users who propagate the information i.

In several embodiments, the probability server system 102 selects the influencer node u among those nodes of the social graph 104 that have been involved in generation of a link with the information i in the past and chooses the node v among those users connected to the node u to connect a link to the node v. For example, the one or more processors of the probability server system 102 records a time at which the node v performs some action on a media, e.g., downloads the media, reviews the media, listen to the media, browse through the media, a combination thereof, etc. It should be noted that an assumption is made by the one or more processors of the probability server system 102 that the node v acts on the media based on peer influence, e.g., influence by the node u. Users tend to influence each other, with different strengths. When the time of activation is recorded, the one or more processors of the probability server system 102 may lack knowledge that the node u propagated information that is acted upon by the user v. For example, when the data 106 regarding propagation of information is received from one or more servers outside the probability server system 102, the one or more processors of the probability server system 102 lack knowledge that the node u provided a suggestion that instigated the node v to act upon the suggestion. In this example, based on information that the node u generated the information i and posted the information within a social network, the one or more processors of the probability server system 102 assume that the node v received the information i from the node u instead of other nodes of the social graph 104.

In some embodiments, the one or more processors of the probability server system 102 determine that a propagation of information from the node u to the node v is more likely than not when the probability 124 that the node u of the social graph 104 will be an influencer of the activation a within the community k is high, e.g., greater than 50%, etc., and when the probability 126 that the node v of the social graph 104 will be an influencee of the activation a performed by the node u within the community k is high, e.g., greater than 50%, etc.

In various embodiments, the probability 120 of active involvement of the node u within the community k and the probability 122 of passive involvement of the node v within the community k are determined simultaneous with, e.g., at the same time, within a threshold time period of, etc., the determination of the probabilities 124 and 126. For example, the probability 120 is determined simultaneous with the probability 124 and the probability 122 is determined simultaneous with the probability 126.

In various embodiments, the time t is a time at which the node v adopted, e.g., accessed based on a suggestion from the node u, posted based on the suggestion, a combination thereof, etc., the information i.

In some embodiments, the information i includes a user identifier and a timestamp. For example i=(user identifier, timestamp), where the user identifier includes a username of a user used to access a social network account, a password of the user used to access the social network account, or a combination thereof, and the timestamp is a timestamp of receipt of information by the user in the social network account, a timestamp of accessing the information, a timestamp of posting the information in the social network account, etc.

In various embodiments, the node v adopts the information i when the node v accesses the information within his/her/its social network account, posts the information i for access by its peers, e.g., followers, etc., or a combination thereof.

Figure 3C:
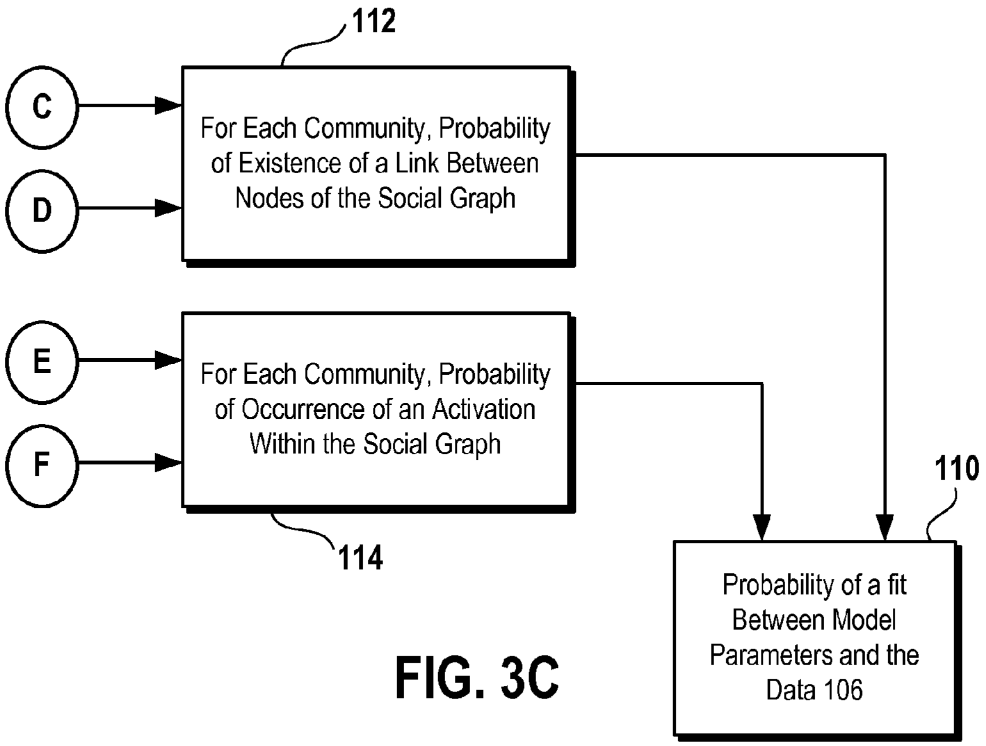
FIG. 3C is a diagram of an embodiment of a flow diagram illustrating a determination of the probability of a fit between model parameters and data regarding propagation of information and the social network based on the probability of existence of the link between nodes of the social graph and the probability of occurrence of the activation within the social graph, in accordance with some embodiments described in the present disclosure.

FIG. 3C is a diagram of an embodiment of a flow diagram illustrating a determination by the one or more processors of the probability server system 102 (FIG. 3A) of the probability 112 of existence of a link between nodes of the social graph 104 and the probability 114 of occurrence of the activation a within the social graph 104 to determine the probability 110. The probability 112 of existence of the link between the nodes u and v of the social graph 104 is calculated as:

$$P(u,v|\Theta)=\Sigma_k \Theta_u^k \Phi_v^k \pi_k \tag{5}$$

where $\Theta$ is a set of model parameters that identifies K communities and is equal to $\{\Pi, \Pi^s, \Pi^d\}$, where $\Pi^s$ IT is a hyperparameter that is a set of levels of active involvement of all nodes of the social graph 104 within all of the K communities and is equal to $\{\pi^{1,s}, \ldots, \pi^{K,s}\}$, where K is a number of communities within the social graph 104, where $\Pi^d$ is a hyperparameter that is a set of levels of passive involvement of all nodes of the social graph 104 within all communities and is equal to $\{\pi^{1,d}, \ldots, \pi^{K,d}\}$, and $\Pi$ is a hyperparameter that is a set of levels of involvement, including active and/or passive, of all nodes of the social graph 104 within all of the K communities and is equal to $\{\pi^1, \ldots, \pi^K\}$. In various embodiments, the number K is the same as the number 108 (FIG. 1) that is received from the user via the input device. In some embodiments, K is a number of overlapping communities and two communities overlap when one or more nodes of the communities are common, e.g., in both the communities. The number K is a positive integer. In various embodiments, the hyperparameter $\Pi^s$ associates each node of the social graph 104 to the level 116 of active involvement and the hyperparameter $\Pi^d$ associates each node of the social graph 104 to the level 118 of passive involvement.

In various embodiments, the probability 112 of existence of the link between the nodes u and v of the social graph 104 is a sum over all communities K of a product of the probability 120 of active involvement of the node u within the community k, the probability 122 of passive involvement of the node v within the community k, and level of involvement of the nodes u and v within the community k.

In some embodiments, the level of involvement of the nodes u and v within the community k is equal to a sum of the level 116 of active involvement of the node u within the community k and the level 118 of passive involvement of the node v within the community k.

The probability 114 of occurrence of the activation a within the social graph 104 is calculated as:

$$P(a \mid \Theta) = \Sigma_k \Sigma_{u \in F_{i_a}, v_a} (\pi_k \theta_u^{k,a} \phi_{u,v}^{k,a}) \tag{6}$$

For example, the probability of 114 of occurrence of the activation a is equal to a sum over communities k of a sum over all active nodes of a product of the probability 124 that the node u of the social graph 104 will be an influencer on the node v of the activation a within the community k, the probability 126 that the node v of the social graph 104 will be an influencee of the activation a performed by the node u within the community k, and the level of involvement of the nodes u and v within the community k.

In various embodiments, the probability 114 of occurrence of the activation a is high when the probability 124 that the node u of the social graph 104 will be an influencer of the activation a within the community k is high, e.g., greater than 50%, etc., and the probability 126 that the node v of the social graph 104 will be an influencee of the activation a performed by the node u within the community k is high, e.g., greater than 50%, etc.

In several embodiments, the activation a is associated with the same community as that to which the information is associated. For example, the activation a includes accessing media regarding the same topic that is a topic of the information propagated between nodes of the social graph 104. As another example, the activation a includes downloading a video that has the same subject matter as that of another video regarding the subject matter propagated between nodes of the social graph 104.

In some embodiments, the probability 112 of formation of the link between the nodes u and v of the social graph 104 is determined simultaneous with, e.g., at the same time, within a threshold time period of, etc., a time of determination of the probability 114 of occurrence of the activation a.

The probability 110 of a fit between the model parameters Θ and the data 106 regarding propagation of information and the social graph 104 is equal to:

$$P(G, D \mid \Theta) = \prod_{(u,v) \in A} P(u, v \mid \Theta) \prod_{a \in D} P(a \mid \Theta) \tag{7}$$

where G is the social graph 104, D is an activation log and is a set of links (i,v) to the node v, $\Pi_{(u,v)\in A}P(u, v|\Theta)$ is a first product of probabilities 112 of existence of the link between the nodes u and v of the social graph 104 over all followers and followed nodes of the social graph 104, $\Pi_{a\in D}P(a|\Theta)$ is a second product of probabilities 114 of occurrence of the activation a over all links (i,v) of the social graph 104. For example, the probability 110 is a product of the first product and the second product. The first product is used to generate a network of nodes of the social graph 104 with links between the nodes and the second product is used to generate activations between the nodes that are linked.

In some embodiments, the social graph G=(N, A).

In some embodiments, the probability server system 102 maximizes the probability 110.

Figure 4:
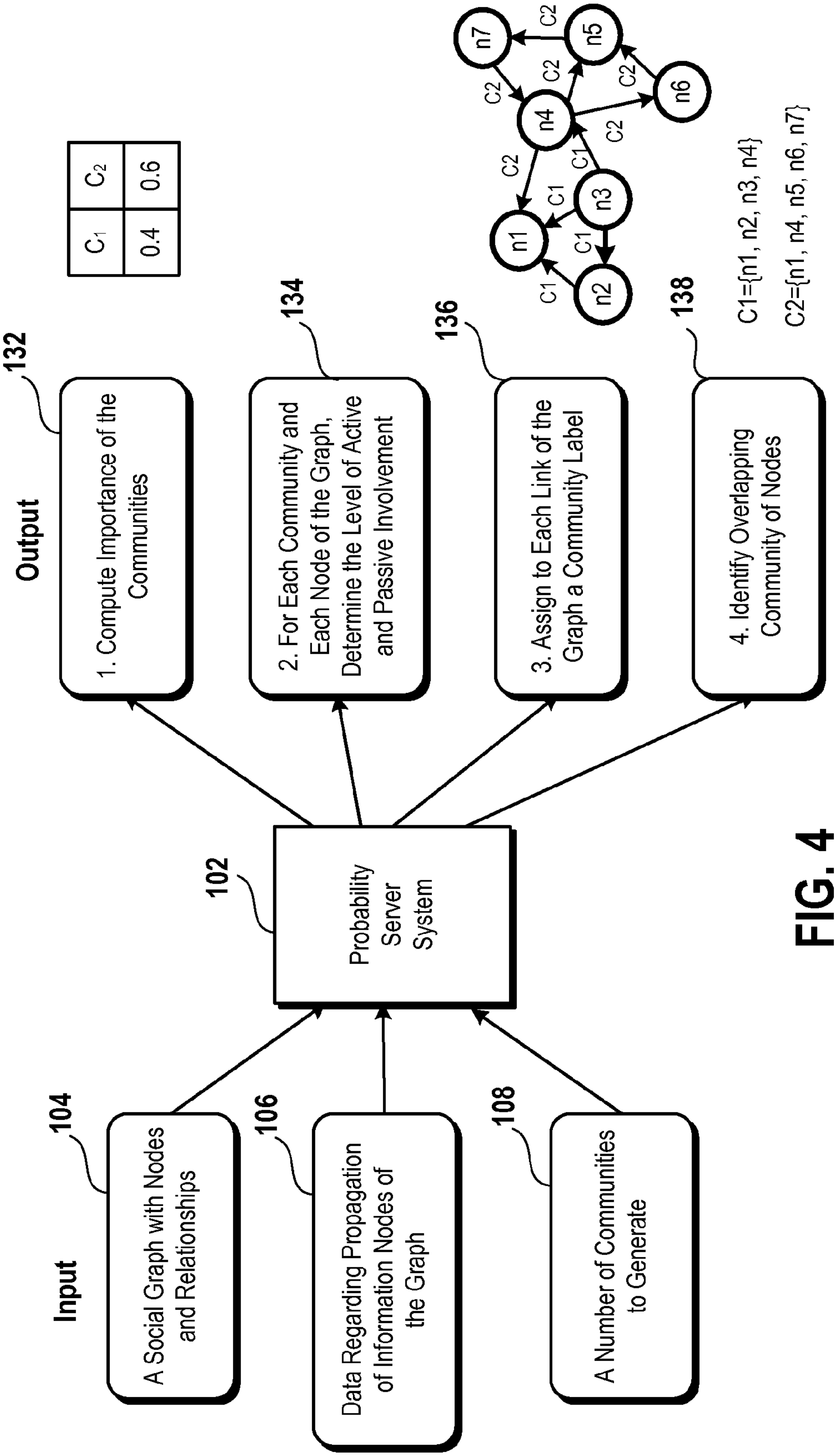
FIG. 4 is a flow diagram illustrating inputs and outputs of the probability server system, in accordance with several embodiments described in the present disclosure.

FIG. 4 is a flow diagram illustrating inputs and outputs of the probability server system 102. The inputs to the probability server system 102 include the social graph 104, the data 106 regarding propagation of information between nodes of the social graph 104, and the number 108 of communities to identify within the social graph 104. Based on the social graph 104, the data 106, and the number 108, the probability server system 102 determines computes 132 importance of communities created within the social graph 104. For example, the probability server system 102 determines an importance of the community k as a ratio of the probability of existence of a link between the nodes u and v within the community k to a sum of probabilities of existence of links between all nodes of the social graph 104 within all communities K of the social graph 104. For example, when a probability of existence of a link regarding a topic of "chewing gum" between two nodes of the community k is 0.1 and a sum of probabilities of existence of links regarding all topics between all nodes of the social graph 104 is 0.5, an importance of the community related to "chewing gum" is 0.1/0.5.

The one or more processors of the probability server system 102 determine 134 the levels 116 and 118 for each node u or v and for each community k of the social graph 104 (FIG. 1) based on the data 106 and the social graph 104. Moreover, the one or more processors of the probability server system 102 assign 136 to each link of the social graph 104 a community label. For example, a link (i1,v1) between nodes u1 and v1 of the social graph 104 is assigned a community label of the community C1 and another link (i2,v1) between the nodes u1 and v1 is assigned a community label of the community C2, where both i1 and C1 relate to a topic of "staplers" and both i2 and C2 relate to a topic of "tape". As another example, a link (i1,v2) between nodes u2 and v2 of the social graph 104 is assigned the community label of the community C1 and another link (i2,v2) between the nodes u2 and v2 is assigned the community label C2.

Also, in an operation 138, the one or more processors of the server system 102 identify overlapping communities of nodes. For example, the one or more processors of the server system 102 determine that the community C1 is formed by and includes a set of nodes n1, n2, n3, and n4 of the social graph 104 and the community C2 is formed by and includes a set of nodes n1, n4, n5, n6, and n7 of the social graph 104. In this example, the one or more processors determine that the communities C1 and C2 that have nodes n1 and n4 as common nodes, overlap with each other. The node n1 belongs to both the communities C1 and C2 and the node n2 belongs to both the communities C1 and C2.

Figure 5:
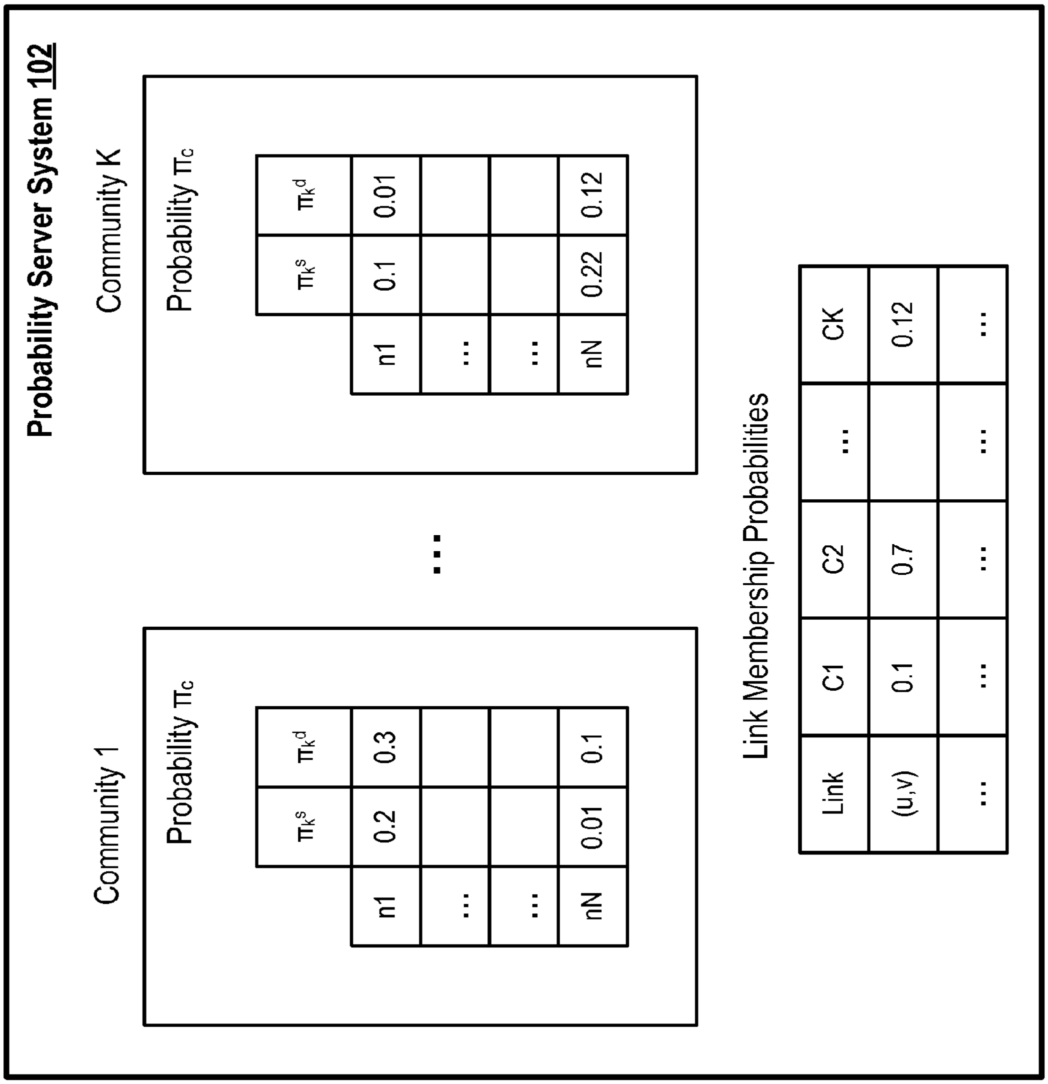
FIG. 5 is a diagram of an embodiment of the probability server system that determines a probability of a node of the social graph being a source within a community and a probability of the node being a destination within the community, in accordance with various embodiments described in the present disclosure.

FIG. 5 is a diagram of an embodiment of the probability server system 102 that determines a probability $\Pi^s_k$ of a node of the social graph 104 being a source within the community k and a probability $\Pi^d_k$ of the node being a destination within the community k. For example, the one or more processors of the server system 102 determine the probability $\Pi^s_k$ of the node u as being equal to the probability 120 of active involvement of the node u within the community k. As another example, the one or more processors of the server system 102 determine the probability $\Pi^d_k$ of the node u as being equal to the probability 122 of passive involvement of the node v within the community k.

Moreover, the one or more processors of the probability server system 102 determine a probability that a link between the nodes u and v will belong to a community. For example, a probability that a link between the nodes u and v will belong to the community C1 is 0.1, a probability that a link between the nodes u and v will belong to the community C2 is 0.7, and a probability that a link between the nodes u and v will belong to the community CK is 0.12. The probability that a link between the nodes u and v belongs to the community k is determined as:

$$\gamma_{u,v,k}(\Theta) = \frac{\vartheta_u^k \varphi_v^k \pi_k}{\Sigma_{k'} \vartheta_u^{k'} \varphi_v^{k'} \pi_{k'}} \tag{8}$$

where k' is an index that spans over all communities, e.g. C1, C2. C3, k, etc., within the social graph 104. For example, the probability that a link between the nodes u and v belong to the community k is a ratio of a product of the probability 120 (FIG. 3B), the probability 122 (FIG. 3B), and the level of involvement of the nodes u and v within the community k over the probability 112 (FIG. 2) of existence of the link between the nodes u and v of the social graph 104.

In some embodiments, a node belongs to a community when the node has at least one link labeled with the community. When a link is labeled with a community, the link belongs to the community.

Moreover, the one or more processors of the probability server system 102 determine a probability that the activation a of the node v by the node u will belong to a community. The probability that the activation a of the node v by the node u will belong to the community k is determined as:

$$\eta_{u,a,k}(\Theta) = \frac{\pi_k \theta_u^{k,a} \phi_{u,v}^{k,a}}{\Sigma_{k'} \Sigma_{u' \in F_{i_a},v_a} \left(\pi_{k'} \theta_{u'}^{k',a} \phi_{u',v}^{k',a}\right)} \tag{9}$$

For example, the probability that the activation a of the node v by the node u will belong to the community k is a ratio of a product of the probability 124 (FIG. 3B), the probability 126 (FIG. 3B), and the level of involvement of the nodes u and v within the community k over the probability 114 (FIG. 3C) of occurrence of the activation a within the social graph 104.

Figure 6:
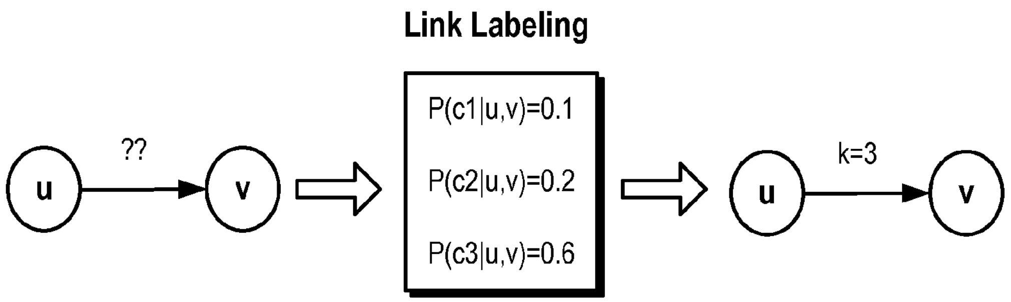
FIG. 6 is a flow diagram illustrating labeling of a link between nodes of the social graph, in accordance with some embodiments described in the present disclosure.

FIG. 6 is a flow diagram illustrating labeling of a link between the nodes u and v. As shown, a probability of a link between the nodes u and v as belonging to the community C1 is 0.1, a probability of a link between the nodes u and v as belonging to the community C2 is 0.2, and a probability of a link between the nodes u and v as belonging to the community C3 is 0.6. Moreover, as shown, a number of links, e.g., communities, formed between the nodes u and v is equal to 3.

In some embodiments, a link between two nodes is labeled with only one community and the link has the highest probability of belonging to the community compared to probabilities of belonging to other communities. When two nodes are coupled by a link that belongs to a community, the nodes belong to the community.

Figure 7:
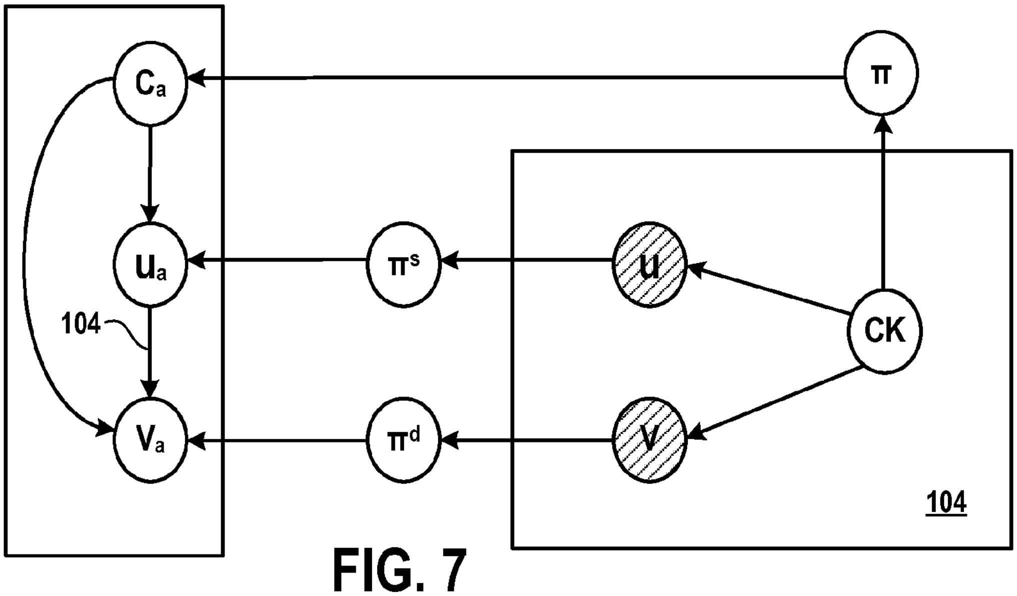
FIG. 7 is a diagram of an embodiment of a flow between the social graph and an activated community, in accordance with several embodiments described in the present disclosure.

FIG. 7 is a diagram of an embodiment of a flow between the social graph 104 and a community $c_a$. As shown, there exist K communities $C_K$ within the social graph 104. The social graph 104 also includes the nodes u and v. Based on the hyperparameters $\Pi$, $\Pi^s$, and $\Pi^d$, a probability of occurrence of the activation a within a community c and a probability of existence of a link 140 between the nodes u and v is determined by the one or more processors of the probability server system 102 (FIG. 1).

Figure 8:
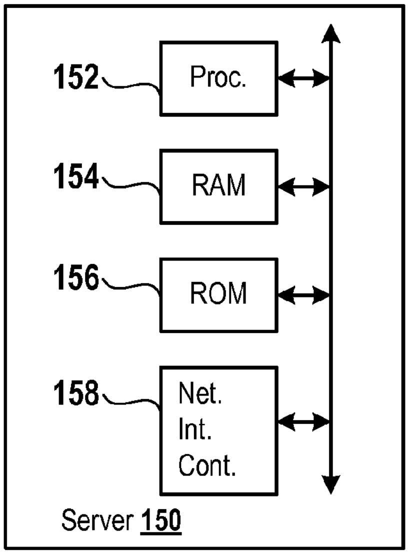
FIG. 8 is a diagram of an embodiment of a server of the probability server system, in accordance with some embodiments described in the present disclosure.

FIG. 8 is a diagram of an embodiment of a server 150 of the probability server system 102 (FIG. 1). The server 150 includes a processor 152, a RAM 154, a ROM 156, and a network interface controller 158. Examples of the network interface controller 158 include a network interface card. In some embodiments, a modem is used instead of the network interface controller 158. In several embodiments, any number of processors, any number of RAMs, and any number of ROMs are used within the server 150. In some embodiments, the processor 152 executes the operations described herein as being performed by the one or more processors of the server system 102. The processor 152 communicates with the client device via the network interface controller 158. The processor 152, the RAM 154, the ROM 156, and the network interface controller 158 are coupled with each other via a bus 160 and communicate with each other using the bus 160.

In some embodiments, the RAM 154, the ROM 156, or a combination thereof is a non-transitory computer-readable medium that includes a code for performing the operations described herein as being performed by the probability server system 102 (FIG. 1). In various embodiments, the community k, the social graph 104, the data 106, the number 108 of communities (FIG. 1), the levels 116 and 118 (FIG. 3A), the probabilities 120, 122, 124, and 126 (FIG. 3B), and the probabilities 112, 114, and 110 are stored within the RAM 154, the ROM 156, or a combination thereof for access by the processor 152.

Although various embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:

receiving a social graph, the social graph including nodes and relationships between the nodes;

receiving a number of communities to find within the social graph;

receiving data regarding propagation of information between the nodes;

calculating a probability of formation of a link between a first one of the nodes and a second one of the nodes based on the data, the link providing a direction of flow of media between the first and second nodes, wherein the probability of formation of the link includes a probability that the media will be sent from the first node to the second node, wherein the probability that the media will be sent from the first node to the second node is based on a level of publication of at least some of the information within one of the communities by the first node; and calculating a probability that the media will be accessed by the second node based on the data, wherein the method is executed by a processor.

2. The method of claim 1, wherein the data regarding propagation of information includes one or more identifiers of the information and one or more times at which the information is propagated from the first node to one or more of the nodes.

3. The method of claim 1, wherein the probability of formation of the link includes a sum over all the communities of a product of a first probability, a second probability, and a level of involvement of the first and second nodes within the community, wherein the first probability includes a probability of active involvement of the first node within the community, wherein the second probability includes a probability of passive involvement of the second node within the community, and wherein the probability of active involvement of the first node is based on the level of publication by the first node.

4. The method of claim 1, wherein the probability that the media will be accessed by the second node includes a first sum over all the communities of a second sum, the second sum being over all active nodes of the social graph of a product of a first probability, a second probability, and a level of involvement of the first and second nodes within the community, wherein the first probability is that the first node will be an influencer of the second node within the community, and the second probability is that the second node will be an influencee of the first node within the community.

5. A method comprising:

receiving a social graph, the social graph including nodes;

receiving a number of communities to find within the social graph;

receiving data regarding propagation of information between two or more of the nodes of the social graph;

for each community, determining a probability of formation of a link between a first one of the nodes and a second one of the nodes, the link providing a direction of propagation of additional information from the first node to the second node, wherein the probability of formation of the link includes a probability that the additional information will be sent from the first node to the second node, wherein the probability that the additional information will be sent from the first node to the second node is based on a level of publication of at least some of the information within the community by the first node; and for each community, determining a probability of occurrence of an activation in the community of the second node, the activation including a passive involvement of accessing the additional information, wherein the method is executed by a processor.

6. The method of claim 5, wherein each node is associated with a social network service account.

7. The method of claim 5, wherein each community is identified using a title of media, or a name of the media, or a topic of the media, or a subject matter of the media, or content of the media, or a keyword extracted from the media, or metadata about the media, or a combination thereof.

8. The method of claim 5, wherein the data received regarding propagation of the information includes a title of media, or a name of the media, or a topic of the media, or a subject matter of the media, or content of the media, or a keyword extracted from the media, or metadata about the media, or a combination thereof.

9. The method of claim 5, further comprising:

determining a level of active involvement for each node and for each community of the social graph, wherein the level of active involvement includes the level of publication; and determining a level of passive involvement for each node and for each community of the social graph.

10. The method of claim 9, wherein the active involvement includes generating the information and posting the information or posting the information to a social network server.

11. The method of claim 5, wherein the passive involvement excludes generating the information and posting the information to a social network server.

12. The method of claim 5, further comprising:

for each community, determining a level of active involvement of the first node within the community, wherein the level of active involvement includes the level of publication;

for each community, determining a level of passive involvement of the second node;

for each community, determining a probability of active involvement of the first node based on the level of active involvement of the first node; and for each community, determining a probability of passive involvement of the second node based on the level of passive involvement of the second node.

13. The method of claim 12, wherein determining the probability of formation of the link between the first and second nodes is based on the probability of active involvement and the probability of passive involvement.

14. The method of claim 5, further comprising:

for each community, determining a level of active involvement of the first node, wherein the level of active involvement includes the level of publication;

for each community, determining a level of passive involvement of the second node;

for each community, determining a probability that the first node will be an influencer of the activation based on the level of active involvement of the first node; and for each community, determining a probability that the second node of the social graph will be influenced by the activation based on the level of passive involvement of the second node.

15. The method of claim 14, wherein determining the probability of occurrence of the activation within the social graph is based on a probability that the first node will be the influencer of the activation and the probability that the second node will be influenced by the activation.

16. The method of claim 5, wherein the activation includes a reception of the additional information by the second node from the first node and access of media by the second node based on the additional information.

17. The method of claim 5, wherein determining of the probability of formation of the link between the first and second nodes is performed simultaneous with determining the probability of occurrence of the activation in the community of the second node.

18. A method for identifying communities based on information propagation data, the method comprising:

receiving a social graph, the social graph including nodes and relationships between the nodes;

receiving a number of the communities to find within the social graph;

receiving data regarding propagation of information between two or more of the nodes of the social graph;

for each community, determining a probability of existence of a link between a first one of the nodes and a second one of the nodes, the link providing a direction of propagation of additional information between the first and second nodes; and for each community, determining a probability of occurrence of an activation in the community of one or more of the nodes, the activation including a passive involvement of accessing the additional information;

determining a level of active involvement of the first node within one of the communities of the social graph;

determining a level of the passive involvement of the second node within the community;

determining a probability that the first node will be an influencer of the activation within the community based on the level of active involvement of the first node within the community;

determining a probability that the second node of the social graph will be influenced by the activation within the community based on the level of passive involvement of the second node within the community, wherein determining the probability of occurrence of the activation within the social graph is based on a probability that the first node will be the influencer of the activation and the probability that the second node will be influenced by the activation; and determining a probability of a fit between model parameters and the data regarding propagation of the information and the social graph based on the probability of occurrence of the activation within the social graph and the probability of the existence of the link between the first node and the second node, wherein the method is executed by a processor.

19. The method of claim 18, wherein the probability of the existence of the link includes a probability that the additional information will be sent from the first node to the second node.

20. The method of claim 18, wherein the level of active involvement includes a level of publication of the information by the first node to one or more of remaining ones of the nodes, wherein the level of the publication includes a level of posting the information within a social network identified by the social graph.

* * * * *